United States Patent
Aspeslagh et al.

(10) Patent No.: US 9,341,383 B2
(45) Date of Patent: May 17, 2016

(54) HEATING SYSTEM AND METHOD FOR CONTROLLING A HEATING SYSTEM

(75) Inventors: Bart Aspeslagh, Oostende (BE); Stefanie Debaets, Oostende (BE)

(73) Assignees: Daikin Industries, Ltd., Osaka (JP); DAIKIN EUROPE N.V., Oostende (BE)

( * ) Notice: Subject to any disclaimer, the term of this patent is extended or adjusted under 35 U.S.C. 154(b) by 548 days.

(21) Appl. No.: 13/990,707

(22) PCT Filed: Dec. 6, 2011

(86) PCT No.: PCT/JP2011/006812
§ 371 (c)(1),
(2), (4) Date: May 30, 2013

(87) PCT Pub. No.: WO2012/077333
PCT Pub. Date: Jun. 14, 2012

(65) Prior Publication Data
US 2013/0248609 A1    Sep. 26, 2013

(30) Foreign Application Priority Data

Dec. 8, 2010    (EP) .................................... 10194129

(51) Int. Cl.
*F24D 12/02*    (2006.01)
*F24D 3/18*    (2006.01)
(Continued)

(52) U.S. Cl.
CPC ...... *F24D 12/02* (2013.01); *F24D 3/08* (2013.01); *F24D 3/18* (2013.01); *F24D 15/04* (2013.01);
(Continued)

(58) Field of Classification Search
CPC . F24D 12/02; F24D 19/1039; F24D 19/1072; F24D 15/04; F24D 3/18; F24D 3/08; F24D 2220/0228; F24D 2200/046; F24D 2200/123; F24D 19/10; Y02B 30/12; Y02B 30/14

USPC .......... 237/2 B, 8 A, 2 A, 8 C, 19, 59, 63, 81; 236/1 H; 62/3.3, 148, 160, 324.1
See application file for complete search history.

(56) References Cited

U.S. PATENT DOCUMENTS 4,187,687 A * 2/1980 Savage ................ F24D 11/0221
165/141
4,245,476 A * 1/1981 Shaw .................. F24D 11/0221
237/2 B
(Continued)

FOREIGN PATENT DOCUMENTS

| EP | 2 133 629 A1 | 12/2009 |
| EP | 2 159 495 A1 | 3/2010 |
| WO | 2010/058397 A1 | 5/2010 |

OTHER PUBLICATIONS

European Search Report of corresponding EP Application No. 13 16 2094.0 dated May 17, 2013.
(Continued)

*Primary Examiner* — Gregory Huson
*Assistant Examiner* — Daniel E Namay
(74) *Attorney, Agent, or Firm* — Global IP Counselors

(57) ABSTRACT

A heating system includes a flow circuit carrying working fluid at a set flow temperature to a heat emitting section, an electricity driven heat pump having a first heat exchanger, and a fuel fired boiler having a second heat exchanger. The first and second heat exchangers are connected to the flow circuit to heat the working fluid in succession. A coefficient of performance ($COP_{Set\ Flow\ Temperature}$) of the heat pump and a break even coefficient of performance (BECOP) are determined, and the $COP_{Set\ Flow\ Temperature}$ and BECOP compared. The BECOP is electricity price/fuel price*boiler thermal efficiency. If the $COP_{Set\ Flow\ temperature}$ is smaller than the BECOP in a first hybrid mode, an intermediate flow temperature is determined, the heat pump is operated to heat the working fluid to the intermediate flow temperature and the boiler is operated to heat the working fluid to the set flow temperature.

17 Claims, 4 Drawing Sheets

(51) Int. Cl.
  *F24D 15/04* (2006.01)
  *F24D 19/10* (2006.01)
  *F24D 3/08* (2006.01)

(52) U.S. Cl.
  CPC ........ *F24D 19/1039* (2013.01); *F24D 19/1072* (2013.01); *F24D 2200/046* (2013.01); *F24D 2200/123* (2013.01); *F24D 2220/0228* (2013.01); *Y02B 30/12* (2013.01); *Y02B 30/14* (2013.01)

(56) References Cited

U.S. PATENT DOCUMENTS

| | | | | |
|---|---|---|---|---|
| 4,438,881 A * | 3/1984 | Pendergrass | ........ | F24D 11/0221 237/2 B |
| 4,476,920 A * | 10/1984 | Drucker | ............ | F24D 19/1087 165/242 |
| 4,751,823 A * | 6/1988 | Hans | ........ | F24D 17/02 237/2 B |
| 4,790,477 A * | 12/1988 | Forkin | ................ | F24D 11/0264 126/585 |
| 4,909,045 A * | 3/1990 | Melzi | ........ | F24D 3/18 165/61 |
| 4,943,003 A * | 7/1990 | Shimizu | ................ | F24D 5/12 165/11.1 |
| 4,947,656 A * | 8/1990 | Alvisi | ........ | F24H 4/02 237/2 B |
| 5,003,788 A * | 4/1991 | Fischer | .............. | F25D 21/12 237/2 B |
| 5,067,330 A * | 11/1991 | Cook | ................ | F25B 15/008 237/2 B |
| 5,405,079 A * | 4/1995 | Neeley | ........ | F24D 19/1039 165/241 |
| 5,558,273 A * | 9/1996 | Swenson | ............. | F24D 17/02 165/104.19 |
| 5,669,228 A * | 9/1997 | Iga | ........ | F25B 29/003 237/2 B |
| 5,947,373 A * | 9/1999 | Saito | ................ | F24F 1/0003 165/240 |
| 6,289,685 B1 * | 9/2001 | Utsumi | ................... | F25B 13/00 126/116 R |
| 6,536,677 B2 * | 3/2003 | Melendez-Gonzalez | .............. | F24F 5/0046 126/587 |
| 6,729,390 B1 * | 5/2004 | Toth | ........ | F24D 12/02 165/240 |
| 6,808,119 B2 * | 10/2004 | Lee | ........ | F25B 30/02 237/2 B |
| 2004/0118933 A1 * | 6/2004 | Readio | ................... | F24D 12/02 237/2 B |
| 2007/0205298 A1 * | 9/2007 | Harrison | ............ | F24D 11/0221 237/2 B |
| 2008/0210768 A1 * | 9/2008 | You | .......... | F24H 4/02 237/2 B |
| 2010/0090017 A1 | 4/2010 | Naghshineh | | |
| 2010/0229583 A1 * | 9/2010 | Komori | .................. | F24D 3/08 62/238.7 |
| 2010/0326075 A1 * | 12/2010 | Fong | ........ | F01K 25/06 60/650 |
| 2010/0326107 A1 * | 12/2010 | Honma | ............ | F25B 9/06 62/203 |
| 2011/0035069 A1 * | 2/2011 | Ogawa | ..................... | H02J 3/14 700/288 |
| 2011/0209478 A1 * | 9/2011 | Morita | ................ | B01D 53/501 60/645 |
| 2012/0144853 A1 * | 6/2012 | Loeffler | ............. | F24D 11/0214 62/238.7 |
| 2012/0180508 A1 * | 7/2012 | Endoh | ................ | F24D 11/0221 62/159 |

OTHER PUBLICATIONS

International Search Report of corresponding PCT Application No. PCT/JP2011/006812.
European Search Report of corresponding European Patent Application No. 10 19 4129.2 dated May 30, 2011.

\* cited by examiner

HEATING SYSTEM AND METHOD FOR CONTROLLING A HEATING SYSTEM

CROSS-REFERENCE TO RELATED APPLICATIONS

This U.S. National stage application claims priority under 35 U.S.C. §119(a) to European Patent Application No. 10194129.2, filed in Europe on Dec. 8, 2010, the entire contents of which are hereby incorporated herein by reference.

BACKGROUND

1. Technical Field

The present invention relates to a heating system for space heating and a method for controlling such a heating system. In particular, the present invention relates to a so called hybrid heating system having an electricity-driven heat pump as a first heat source and a fuel fired boiler as a second heat source for heating a working fluid.

2. Background Art

Such a hybrid heating system is for example known from WO-A-2010/058397 A1. This system is configured to operate the heat pump when the operation of the heat pump is less expensive than the operation of the conventional heating system, such as a fuel fired boiler, and to operate the conventional heating system when the operation of the conventional system is less expensive than the operation of the heat pump.

A disadvantage of such system is that the heat pump and the conventional heating system are alternatively operated. Yet, operation of the heat pump system is preferred from an environmental protection point of view. Further, cost effectiveness is to be further improved.

In addition, US-A-2010/0090017 A1 as well discloses a hybrid heating system in which a heat pump is operated even at low outdoor temperatures in which it is not capable of satisfying the heat load and one other heat source, such a gas furnace, is used to cope for the remaining heat load that cannot be provided by the heat pump. A disadvantage of such a system is that the heat pump is even operated at a very low coefficient of performance (COP) which leads to an inefficient and, therefore, expensive system, as far as the operating costs are concerned.

SUMMARY

Technical Problem

In view of the above, it is an object of the present invention to provide a hybrid heating system and a method for controlling such a heating system which provide for improved cost effectiveness as far as the operating costs are concerned at the same time being as environmentally friendly as possible.

Solution to Problem

This object is solved by a heating system having the features of claim 1 as well as a method for controlling such heating system as defined in claim 12.

Additional aspects of the present invention are named in the dependent claims.

The basic principle underlying the present invention is to provide even in cases in which the operation of a fuel fired boiler were more cost effective than the operation of the heat pump at least a proportion of the heat load required for heating by the heat pump, and preferably the larger proportion. In such mode, the heating system operates both the heat pump and the boiler at the same time both heating the working fluid to the required flow temperature together.

Accordingly, the present invention suggests a heating system, particularly a heating system for space heating. In addition to space heating, however, the heating system of the present invention may as well be used for cooling purposes and/or to provide domestic hot water.

For space heating, the heating system comprises a flow circuit for flowing a working fluid, such as water, at a set flow temperature to a heat emitting section for space heating. The heat emitting section may comprise radiators, floor heating and/or convector heaters and will be located in the space to be heated such as a residential building. The flow temperature which may as well be defined as the supply temperature is defined as the temperature of the working fluid after being heated by the heat sources and (immediately) before being supplied to the heat emitting section. The temperature of the working fluid exiting the emitting section and before being heated by the heat sources is called the return temperature. The flow temperature may be a value set by a user, but preferably is a value set by a control based on the ambient (outdoor) temperature. A further parameter that may be considered in the determination of the flow temperature is a desired room temperature set by the user. That is, if the ambient temperature increases, the flow temperature decreases whereas. If the ambient temperature decreases, the flow temperature increases so that the set space (room) temperature may be obtained. For this purpose, it is preferred that the heating system further comprises an outdoor sensor for measuring an ambient (outdoor) temperature.

The heating system of the present invention comprises an electricity driven heat pump. Such a heat pump may comprise an electricity driven compressor (variable frequency, particularly inverter controlled compressor), a fourth heat exchanger (in a heating mode functioning as an evaporator), an expansion mechanism and the first heat exchanger (functioning in the heating mode as a condenser) connected in a heat pump cycle containing a refrigerant. The refrigerant may for example be R410A. In a heating mode of the heating system and if an air heat pump is used as the heat pump, heat is extracted from the outdoor air and transferred to the refrigerant by means of the fourth heat exchanger. The heat is subsequently transferred by means of the first heat exchanger from the refrigerant to the working fluid in order to heat the working fluid.

Further provided according to the invention is a fuel fired boiler, preferably a conventional gas boiler, even more preferred a gas condensing boiler. Such a boiler transfers heat from combustion and condensation (condensed flue gases from the exhaust) via a second heat exchanger to the working fluid in order to heat the working fluid. The second heat exchanger may e.g. be formed by piping passing through or around or being part of a combustion chamber. The piping may be formed by the supply lines for supplying the water or may be separate therefrom.

In one embodiment of the present invention, an outlet of the heat emitting section may be in fluid communication with an inlet of the first heat exchanger and an outlet of the first heat exchanger may be in fluid communication with an inlet of the second heat exchanger, whereas an outlet of the second heat exchanger may be in fluid communication with the inlet of the heat emitting section.

In an embodiment, the flow circuit in which the working fluid flows is hydraulically separated between the boiler and the heat pump. Such separation may be achieved by means of a balancing vessel interposed between the outlet of the first heat exchanger and the inlet of the second heat exchanger and the outlet of the second heat exchanger and the inlet of the heat emitting section. Alternatively, a further (fifth) heat-exchanger may be used for the hydraulic separation, such as a plate heat exchanger. In this instance, the working fluid passing the boiler may even be selected differently than that passing the heat pump and the heat emitting section. Further, the boiler may have a third heat exchanger used for heating domestic hot water. The third heat exchanger may be a plate heat exchanger connected to a piping passing through or around or being part of the combustion chamber of the boiler and transferring heat to the piping for the hot water supply. Alternatively, the third heat exchanger may be formed by piping for the hot water supply passing through or around or being part of the combustion chamber of the boiler.

According to the present invention, the second heat exchanger is disposed downstream of the first heat exchanger from the outlet of the heat emitting section to the inlet of the heat emitting section. The term "downstream" in this regard refers to the flow direction of the working fluid in the flow circuit.

Further, the heating system of the present invention comprises a control for controlling operation of the heat pump and the boiler. In order to decide which heat source, the heat pump or the boiler, is the most efficient from the view point of operating costs, the control is configured to determine the coefficient of performance of the heat pump for the set flow temperature ($COP_{Set\ Flow\ Temperature}$). This coefficient of performance ($COP_{Set\ Flow\ Temperature}$) may be dependent on the ambient temperature and the set flow temperature. At present it is preferred to calculate the $COP_{Set\ Flow\ Temperature}$ of the heat pump based on full load conditions of the heat pump (i.e. the compressor driven at full load, i.e. the highest possible frequency) to simplify the calculation. It may, however well be, that the $COP_{Set\ Flow\ Temperature}$ of the heat pump is calculated on the actual conditions of the heat pump. This $COP_{Set\ Flow\ Temperature}$ may be calculated from an equation or may be calculated from COP graphs relating to a particular flow temperature, and depending on the ambient temperature. If the set flow temperature resides between two graphs for a higher and a lower flow temperature, two COPs are calculated from the two graphs at measured ambient temperatures. The actual COP at the set flow temperature is interpolated between the two COPs.

Furthermore, the control is configured to determine a break even coefficient of performance (BECOP). The break even coefficient of performance is calculated by the electricity price divided by the fuel price, e.g. the gas price, multiplied by the thermal efficiency $Eta_{th}$ of the boiler. The thermal efficiency $Eta_{th}$ of the boiler preferably is a fixed value. Alternatively, it may be a value depending on the flow temperature and/or the return temperature and/or the ambient temperature. The electricity price and the fuel price may be inputted by a user via an input unit or may be electronically processed from data provided continuously by the electricity and fuel provider, e.g. online via the internet and preferably by WiFi connection. If the prices are inputted by the user, it is conceivable to differentiate the prices in regard of day and night time or more generally if the provider has different prices over 24 hours, different prices may be inputted relating to the corresponding time of the day/night. The schedule may even be different day by day. For example the prices may very between week-end and week.

If the $COP_{Set\ Flow\ Temperature}$ and the BECOP have been determined or calculated, these two values are compared by the control. In the prior art, if the $COP_{Set\ Flow\ Temperature}$ was smaller than the BECOP which indicates that the fuel fired boiler is more effective from the view point of operating costs, the fuel fired boiler was operated only. In contrast and according to the present invention, the control is configured to, in this instance, determine in a first hybrid mode an intermediate flow temperature at which the $COP_{Intermediate\ Flow\ Temperature}$ of the heat, pump is higher than the BECOP calculated as indicated above. This intermediate flow temperature is defined as the temperature between the first heat exchanger and the second heat exchanger, that is, the temperature at the exit of the first heat exchanger. In most cases of the first hybrid mode, the heat pump will be driven under partial load, i.e. the compressor will be driven at a frequency lower than the highest frequency, but it may as well be that the heat pump will be driven under full load. In other words, both full load and partial load operation are possible in the first hybrid mode.

Further, the control is configured to operate the heat pump so that the working fluid is heated to the intermediate flow temperature by the first heat exchanger and to operate the boiler so that the working fluid is heated from the intermediate flow temperature to the set flow temperature by the second heat exchanger.

Due to the configuration of the invention, a certain proportion of the heat load is provided by the heat pump which is beneficial from the environmental point of view. This portion is primarily calculated based on a COP of the heat pump at which the heat pump is more cost efficient in regard of operating costs than the fuel boiler and only the remaining part, is provided by the fuel fired boiler. Thus, the present invention combines the advantages of a cost effective heating system being even more cost effective and more environmentally friendly.

In order to further increase the proportion of the heat load provided by the heat pump, the present invention, according to an embodiment, suggests to in the first hybrid mode control a pump (variable flow pump) circulating the working fluid in the flow circuit so as to reduce the flow rate of the working fluid. If the flow rate of the working fluid is reduced, the return temperature of the working fluid returned to the first exchanger is lowered. The lowering of the return temperature has various advantages. First, the return temperature may at all make it possible to set an intermediate temperature at which the $COP_{Intermediate\ Flow\ Temperature}$ is higher the BECOP. That is if the intermediate flow temperature $T_{intermediate\ flow}$ at which the $COP_{Intermediate\ Flow\ Temperature}$ is first higher than the BECOP was smaller than the return temperature $T_{return}$, the intermediate flow temperature could not be set. Lowering the return temperature, however, makes it possible that $T_{intermediate\ flow} > T_{return}$. Second, the lower the return temperature, the higher the proportion of heat provided by the heat pump. That is, if the return temperature $T_{return}$ is e.g. 30 degrees Celsius and the intermediate flow temperature $T_{intermediate\ flow}$ is e.g. 35 degrees Celsius, the heat provided by the heat pump was 5 degrees Celsius. If the return temperature is lowered to e.g. $T_{return} = 25$ degrees Celsius, the heat provided by the heat pump was 10 degrees Celsius. Third, lowering the return temperature provides for more flexibility in choosing the intermediate flow temperature. If for example, the return temperature $T_{return}$ is e.g. 30 degrees Celsius, a first $COP_{Intermediate\ Flow\ Temperature\ 35\ degrees\ Celsius}$ is first higher than the BECOP. Yet, a Second $COP_{Intermediate\ Flow\ Temperature\ 30\ degrees\ Celsius}$ was higher than the first $COP_{Intermediate\ Flow\ Temperature\ 35\ degrees\ Celsius}$, but is not possible at the return temperature of 30 degrees Celsius, because $T_{intermediate\ flow}$ needs to be higher than $T_{return}$. If the return temperature is lowered to e.g. 25 degrees Celsius both, an intermediate temperature of 30 degrees Celsius and of 35 degrees Celsius is possible. Thus, the control has the flexibility to select the intermediate temperature that realizes the maximum cost savings or the most environmental friendly operation. The more efficient operation in the above example is the 30 degrees Celsius because the $COP_{Intermediate\ Flow\ Temperature\ 30\ degrees\ Celsius}$ is higher than $COP_{Intermediate\ Flow\ Temperature\ 35\ degrees\ Celsius}$ because of the lower flow temperature. However, the proportion of the heat pump is lower at 30 degrees Celsius heating the working fluid by only 5 degrees Celsius. The less efficient operation is the 35 degrees Celsius because the $COP_{Intermediate\ Flow\ Temperature\ 30\ degrees\ Celsius}$ is higher than $COP_{Intermediate\ Flow\ Temperature\ 35\ degrees\ Celsius}$ because of the lower flow temperature. However, the proportion of the heat pump is higher at 35 degrees Celsius heating the working fluid by 10 degrees Celsius. Both the efficiency (COP) and the proportion of the heat pump influence the cost savings. The control in view of the above is configured to select the intermediate temperature so that the system works as cost effective as possible or as environmental friendly as possible. Further, the intermediate flow temperature may be set higher (earlier) as the COP at a higher flow temperature already exceeds the BECOP. Thus, this particular embodiment further increases the proportion of the heat load provided by the heat pump at a level at which the heat pump is more cost effective than the fuel fired boiler so that the heating system is even more cost effective and environmentally friendly than that above.

Yet, if the return temperature is decreased, the temperature of the emitting section, that is the average temperature of the ingoing and outgoing working fluid temperature of the heat emitters of the heat emitting section, is lower causing a lower heat emission capacity. In order to compensate for such a loss of heat emission capacity, the control according to the present invention is configured to increase the set flow temperature stepwise (at least two steps) with a time interval in between two consecutive steps after the flow rate of the working fluid has been reduced. As the flow temperature is not increased in one step from the actual flow temperature to the flow temperature required to reach the required average temperature of the heat emitters of the heat emitting section, but step by step, the time interval until the required set flow temperature to obtain the required emission capacity is reached is extended. During this period of time, the proportion of the heat load provided by the heat pump is higher than it were if the set flow temperature were increased in one step only, because a lower return temperature may be maintained for a longer period of time (the return temperature increases with an increase of the flow temperature).

In addition, it is preferred that the heating system comprises a room sensor for measuring a space (room) temperature in the space to be heated. Preferably, only one such room sensor is provided in e.g. the living room of the space to be heated. If a plurality of rooms are provided with room sensors each room temperature may be calculated. Further, the user in the space to be heated or in the different rooms of the space to be heated sets a temperature/-s which is/are the desired room temperatures for the space to be heated or each room to be heated. This may be obtained by centrally setting a desired room temperature in. e.g. the living room and/or by setting an individual desired room temperature for each room. In this preferred embodiment, the value of each step, that is the temperature difference by which the flow temperature is increased or decreased and/or the length of each time interval between two consecutive steps is dependent on the difference between the desired room temperature and the measured room temperature. In case of a difference for each room, on possibility may be to select the highest difference. Alternatively, an average difference may be calculated. If the difference is small, the value of the step may be small and/or the length of the time interval may be long, whereas if the difference is high, the value of the step may be high and/or the length of the time interval may be short. That is, if there is a high heating demand and in order to prevent loss of comfort in the space, the adaption to the required flow temperature is accelerated, whereas if there is only low heating demand, the adaption is slowed down the keep the proportion of the heat load provided by the heat pump high as long as possible.

If, however, a maximum allowable flow temperature has been reached, that is e.g. a maximum flow temperature of the boiler or given by a certain heat emitter of the heat emitting section, and the measured room temperature is still lower than the desired room temperature, it is preferred to increase the flow rate stepwise (at least two steps), to satisfy the heat demand. This step is preferably a fixed step, but may be variable as stated above as well. Further, it is preferred to decrease the flow rate again, however, preferably in one step, once the measured room temperature is equal to or higher than the desired room temperature. In addition, the flow temperature may then again be lowered stepwise as described above.

Further, it is generally known that a heating system heats a space to be heated until the desired room temperature is exceeded by a certain value, for example 1 or 2 degrees Celsius. Hence, it is preferred that if the desired room temperature is exceeded by a certain value, the set flow temperature is again stepwise decreased in order to again increase the proportion of the heat load provided by the heat pump. Also this step and the time intervals are again preferably dependent on the difference between the desired room temperature and the space to be heated and the measured room temperature. That is, if the desired room temperature is very much lower than the measured room temperature, the step may be large and/or the length of the time interval may be short. If the difference is only small, that is the actual room temperature is only slightly above the desired room temperature, the value may be small and/or the length of the time interval may be long.

The increase/decrease of the flow temperature may further provide for a more stable operation and prevents a high cycling rate of thermostats provided in the rooms or spaces to be heated.

According to a further embodiment of the present invention, the control is further configured to determine whether the heat pump is capable of satisfying the required heat demand to heat the working fluid to the set flow temperature or the intermediate flow temperature and to determine the operation based on the determination. That is, the control determines preferably based on the outdoor temperature measured by an outdoor sensor and the set flow temperature whether the heat pump (at full load) can at all heat the working fluid to the set flow temperature or the intermediate flow temperature without the boiler.

That is, in the present invention the control is preferably configured to operate in the first hybrid mode the heat pump and the boiler if the heat pump is capable of satisfying the required heating demand to heat the working fluid to at least the intermediate flow temperature (and when the $COP_{Set\ Flow\ Temperature}$ is smaller than the BECOP). If the heat pump is not capable of satisfying the required demand or heat the working fluid to an intermediate flow temperature at which the COP intermediate flow temperature is higher than the BECOP, the control is configured to operate in a boiler only mode the boiler only or to lower the return temperature to allow the heat pump to heat the working fluid to an intermediate flow temperature at which the $COP_{intermediate\ flow\ temperature}$ is higher than the BECOP.

In contrast and according to a preferred embodiment, the control is configured to operate in a heat pump mode the heat pump only, if the $COP_{Set\ Flow\ Temperature}$ is higher than the BECOP, that is the heat pump is more cost effective and the heat pump only is capable of satisfying the required heating demand to heat working fluid to the set flow temperature. If the heat pump in this constellation is not capable of satisfying the required heating demand to heat the working fluid to the set flow temperature, the control is configured to operate in a second hybrid mode the boiler and the heat pump, wherein the heat pump heats the working fluid as much as possible under full load and the remaining heat load is provided by the less cost effective boiler.

In a cooling mode, the control is configured to operate only the heat pump. The heat pump, in this instance, however, is operated in a reverse cycle, that is the refrigerant flows in the opposite direction so that heat is extracted from the working fluid so that the working fluid is cooled and the heat is transferred to the outdoor air. In this reverse cycle, the first heat exchanger functions as an evaporator, whereas a further heat exchanger disposed outdoors functions has the condenser.

Beside the heating system described above, the present invention as well suggests a method for controlling such a heating system. However, in order to avoid repetitions, reference is made to the above explanations, wherein the steps to which the control of the heating system is configured to are performed in the method of the present invention or particular embodiments thereof.

Further features and advantages of the present invention which may be implemented in combination with one or more of the features described above will be apparent to the skilled person when considering the following description of a particular embodiment implementing the present invention.

DESCRIPTION OF EMBODIMENTS

Figure 1:
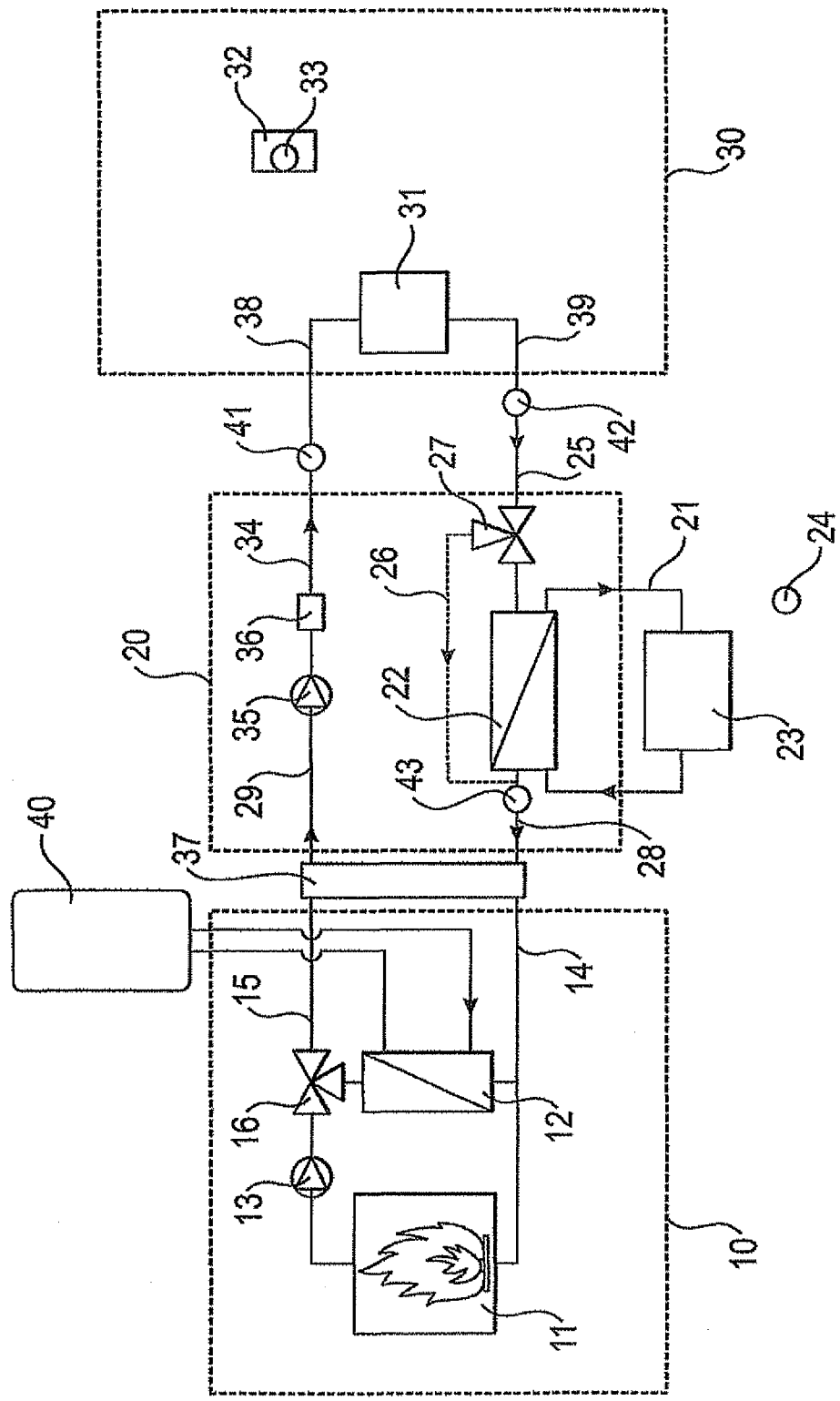
FIG. 1 is a schematic representation of a heating system according to a first embodiment of the present invention.

Reference numerals used throughout the drawings have been used consistently representing the same or similar parts of the heating system. If one element is described with respect to one embodiment, the description of the same element is omitted in the other embodiment/-s and reference is made to the previous description in regard of the embodiment/-s.

FIG. 1 shows a schematic diagram of a heating system according to an embodiment of the invention. The heating system comprises a boiler unit 10, a heat pump unit 20 and an emitting section 30.

The emitting section 30 will in most cases and if the heating system is used for residential heating comprise a plurality of heat emitters such as radiators, floor heating and/or convectors which are located in a plurality of rooms representing the space to be heated. In FIG. 1 the heat emitters have been schematically referred to by the reference numeral 31. Further comprised within the space to be heated is one or more thermostats 32 having a temperature sensor 33 for measuring the temperature in the room in which the temperature sensor 33 is located. In case the emitting section serves for heating of plurality of rooms making up the space to be heated a thermostat may be located in each or most of the rooms and each thermostat 32 will have a room sensor 33. A user may set a desired room temperature via the thermostat 32 which may be different for each room. In addition, a desired room temperature for the space to be heated may be set centrally. The room temperature sensor 33 measures the actual room temperature present in the corresponding room.

The heat pump unit 20 comprises a conventional heat pump circuit 21 which connects a compressor, a condenser, an expansion mechanism and an evaporator in a flow circuit. In a heating mode, the condenser is formed by the first heat exchanger 22. The evaporator is not shown and will be located in an outdoor unit 23. The compressor and the extension means are not shown in FIG. 1. The heat pump which is preferably used in the present invention is an air heat pump so that the evaporator located in the outdoor unit 23 extracts heat from the outdoor air/ambient air, whereby the refrigerant flowing in the circuit 21 is evaporated and flown to the heat exchanger 22 for condensation. In the condensation process, the heat of the refrigerant is transferred to the working fluid (see later). The compressor of the heat pump is preferably a compressor that may be driven at variable frequency so that the heat pump may be driven under full load but also under a partial load. An outdoor temperature sensor 24 may be associated to the outdoor unit 23. Yet, the outdoor sensor 24 may as well be disposed at a different location at which the outdoor temperature may reliably be measured.

The boiler unit 10 in the present embodiment is preferably a conventional gas fired condensing boiler which has the burner (11) and second heat exchanger (not shown) for transferring the heat from combustion and condensation to the working fluid (see later). Further, the boiler unit comprises a third heat exchanger 12 which serves for the production of domestic hot water 40. The domestic hot water is heated directly in the third heat exchanger when being used. Alternatively, the working fluid may be branched off e.g. by means of a three-way valve downstream of the second heat exchanger after being heated by the boiler (burner) and subsequently passes through a coil within a hot water container (storage tank) for heating the water contained in the storage tank, Further contained in the boiler unit 10 is a pump 13 which serves for flowing the working fluid through the third heat exchanger 12 for domestic hot water production or through a balancing vessel (37). The boiler unit 10 further has an incoming line 14 which connects to the outlet of the third heat exchanger 12 and the inlet of the second heat exchanger contained in the burner 11. Further provided is an outlet line 15 which connects to the outlet of the second heat exchanger of the burner 11 and the inlet of the third exchanger 12 via a three-way valve 16.

The heat pump unit 20 as well has a first inlet line 25 which connects to the inlet of the first exchanger 22 and to a bypass 26 bypassing the first heat exchanger 22 via a three-way valve 27. Further provided is a first outlet line 28 connecting to the outlet of the first heat exchanger 22 and the bypass 26. The heat pump unit 20 further comprises a second inlet line 29 connecting to a second outlet line 34 via a pump 35 and a flow sensor 36. The first outlet line 28 of the heat pump unit 20 and the inlet line 14 of the boiler unit 10 as well as the outlet line 15 of the boiler unit 10 and the second inlet line 29 of the heat pump unit 20 are connected to each other via a balancing vessel 37. The balancing vessel serves for hydraulically decoupling the boiler unit from the heat pump unit. Without a balancing vessel the pumps 13 and 35 were connected in series leading to a non-operational system. Alternatively to the balancing vessel a heat-exchanger, such as a plate heat exchanger could be used. In this instance, the boiler lines 14 and 15 were completely decoupled, in terms of fluid communication, from the lines 25, 28, 29, 34, 38 and 39.

Further, the second outlet line 34 of the heat pump unit 20 is connected to an inlet line 38 of the heat emitting section 30 and an outlet line 39 of the heat emitting section 30 is connected to the first inlet line 25 of the heat pump unit 20.

A first temperature sensor 41 is located in the inlet line 38 of the heat emitting section or upstream thereof in the second outlet line 34 of the heat pump unit 20. A second temperature sensor 42 is located in the outlet line 39 of the heat emitting section 30 or downstream thereof in the first inlet line 25 of the heat pump unit 20. A third temperature sensor 43 is located in the first outlet line 28 of the heat pump unit 20 downstream of the first heat exchanger 22 and preferably downstream of the connection of the first outlet line 28 and the bypass 26.

The lines 39, 25, 28, 14, 15, 29, 34 and 38 form a flow circuit for flowing a working fluid such as water to a heat emitting section. The temperature sensor 41 measures the actual flow temperature of the working fluid which enters into the heat emitting section 30 via the line 38. The temperature sensor 42 measures an actual return temperature of the working fluid exiting the heat emitting section 30. The temperature sensor 43 measures a temperature downstream of the first heat exchanger 22 of the heat pump unit 20. The pump 35 serves for circulating the working fluid within the flow circuit. The flow sensor 36 measures the flow of the working fluid.

Figure 2:
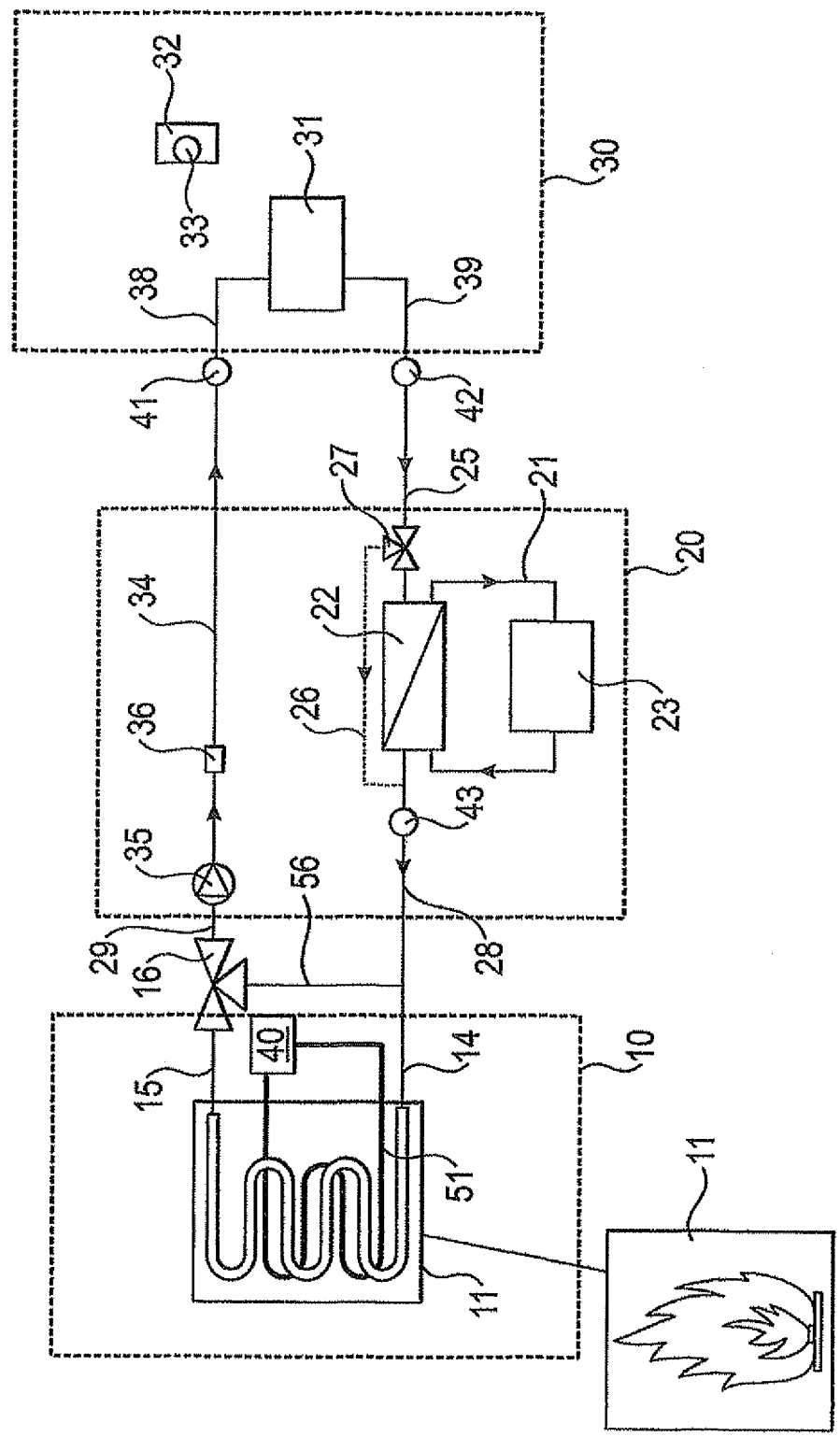
FIG. 2 is a schematic representation of a heating system according to a second embodiment of the present invention.

A second embodiment of the heating system is shown in FIG. 2, same reference numerals are used as in FIG. 1 and only the difference of the second embodiment compared to the first embodiment will be explained. Regarding the remaining part reference is made to the above explanations.

The main difference is that the heat pump unit 20 and the boiler unit 10 are directly connected omitting the balancing vessel. Instead, a bypass line 56 is provided for bypassing the boiler unit, in the below described heat pump (only) mode. To switch between the lines a three-way valve 16 is provided. It is also apparent that the lines 14 and 15 are connected passing through or around the combustion chamber of the burner 11 forming the second heat exchanger.

In addition, the pump 13 is omitted and the lines for domestic hot water supply 51 pass through or around the combustion chamber of the burner 11 forming the third heat exchanger.

The remainder of the second embodiment is the same as in the first embodiment.

In the following and with reference to FIGS. 1 to 3, the function of the heating system in FIG. 1 and the method of controlling is described in more detail.

First, the user sets a desired room temperature via the thermostat 33. A common desired room temperature for all rooms may additionally or alternatively be set in a central control. Further, in the present embodiment, the user via a not shown input device inputs the gas price and the electricity price into the control. In the present embodiment, the electricity price differs for day and night time for example the energy price may be the same from 7 am to 8 pm but lower from 8 pm to 7 am but it could differ on a daily/hourly basis as well. Hence, the user not only inputs the electricity price but also the time during which this price is valid. Alternatively, the control may derive the prices from the providers so that the user does not need to input any prices and any time during which the price is valid.

Figure 4:
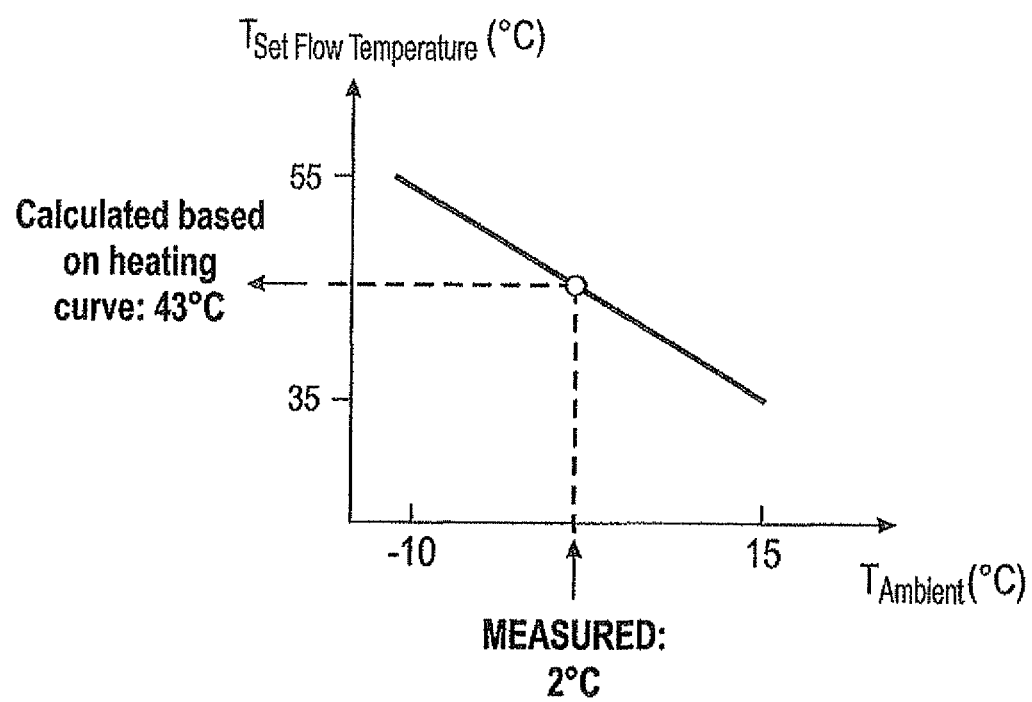
FIG. 4 shows a curve for explaining the calculation of the $T_{flow\ temperature}$ based on $T_{ambient}$.

The control determines based on the measured ambient temperature (sensor 24), a flow temperature required to obtain (the desired) a comfortable room temperature. That is, a heating curve for the space to be heated is contained in the control. Based on the measured outdoor temperature, in the example in FIG. 4 2 degrees Celsius, the control calculates on a flow temperature, e.g. 43 degrees Celsius as being necessary to provide the heat load for the space to be heated, i.e. to heat the space to the desired space temperature.

The coefficient of performance (COP) of the heat pump is dependent on the temperature difference between the ambient temperature and the return temperature (temperature at the inlet of the first heat exchanger) measured by the temperature sensor 42 of the working fluid which, in turn, is dependent on the set flow temperature. In order to conclude on the coefficient of performance of the heat pump at the set flow temperature ($COP_{Set\ Flow\ Temperature}$) in step 101 in one embodiment, a plurality of curves such as five curves for the COP at different flow temperatures and full load of the heat pump may be implemented in the control. In the present example such curves are provided for flow temperatures of 30 degrees Celsius, 35 degrees Celsius, 40 degrees Celsius, 45 degrees Celsius and 50 degrees Celsius.

Figure 3:
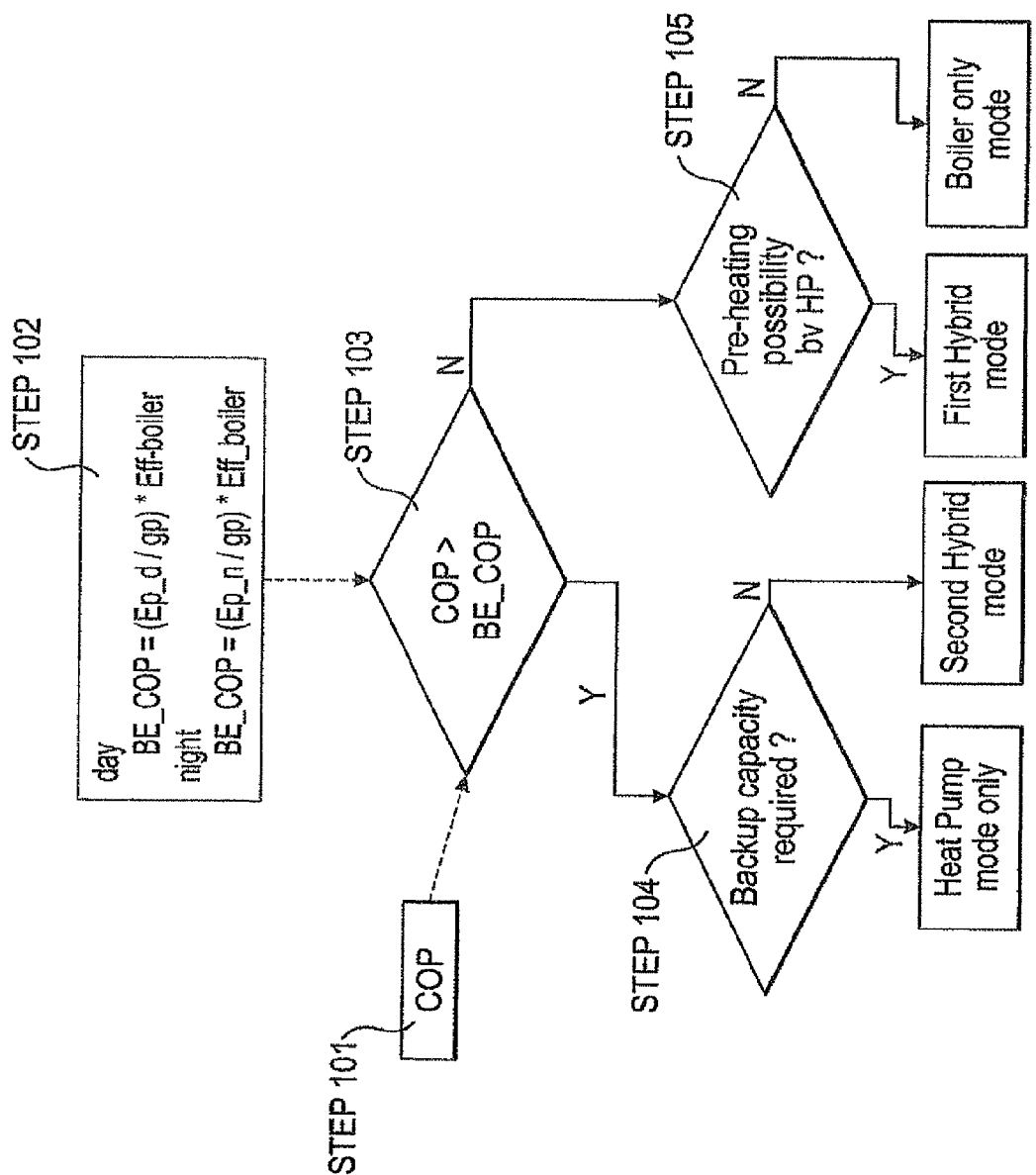
FIG. 3 is a flow chart schematically representing a method for controlling the heating system of FIG. 1 or 2 according to the present invention.

As mentioned in the above and as shown in FIG. 3, the set flow temperature is a flow temperature of 43 degrees Celsius which resides between the curve for 40 degrees Celsius and 45 degrees Celsius.

The function of the curve for the flow temperature of 40 degrees Celsius is for example the following equation, wherein $T_{Ambient}$ is the temperature measured by the sensor 24:

$$COP_{Flow\ Temperature\ 40\ degrees\ Celsius} = 0.0012 \times T_{Ambient}^2 + 0.0664 \times T_{Ambient} + 2.6918$$

The equation for the COP at 45 degrees Celsius has the following equation, wherein $T_{Ambient}$ is the temperature measured by the sensor 24:

$$COP_{Flow\ Temperature\ 45\ degrees\ Celsius} = 0.0011 \times T_{Ambient}^2 + 0.0554 \times T_{Ambient} + 2.3838.$$

To calculate the $COP_{Flow\ Temperature\ 43\ degrees\ Celsius}$, the COP is interpolated between $COP_{Flow\ Temperature\ 40\ degrees\ Celsius}$ and $COP_{Flow\ Temperature\ 45\ degrees\ Celsius}$ according to the following equation:

$$COP_{Set\ Flow\ Temperature\ 43\ degrees\ Celsius} = COP_{Set\ Flow\ Temperature\ 40\ degrees\ Celsius} + (COP_{Set\ Flow\ Temperature\ 45\ degrees\ Celsius} - COP_{Set\ Flow\ Temperature\ 40\ degrees\ Celsius})/(45\ degrees\ Celsius - 40\ degrees\ Celsius)(43\ degrees\ Celsius - 40\ degrees\ Celsius).$$

The $COP_{Flow\ Temperature\ 43\ degrees\ Celsius}$ is, hence, the $COP_{Set\ Flow\ Temperature}$ of the heat pump at the set flow temperature.

Further, the control calculates a break even coefficient of performance (BECOP) in step 102 according to the following equations:

$$BECOP_{day} = (\text{electricity price}_{day}/\text{gas price}) \times Eta_{th}$$

$$BECOP_{night} = (\text{electricity price}_{night}/\text{gas price}) \times Eta_{th}$$

$Eta_{th}$ = thermal efficiency of the boiler unit 10.

Depending on the actual time, the control selects the corresponding $BECOP_{day}$ or $BECOP_{night}$. Or the energy prices valid at the time being, when varying throughout the day.

Further, the control compares the $COP_{Set\ Flow\ Temperature}$ with the $BECOP_{day/night}$ (step 103).

If the $COP_{Set\ Flow\ Temperature} > BECOP$ as shown in FIG. 2, the control further elicits whether the heat pump is capable of heating the working fluid to the set flow temperature (step 104). That is, it is determined whether the heat pump as such is capable of satisfying the heat load of the space to be heated, i.e. whether the heat pump may heat the working fluid to the set flow temperature under full load. If yes, the control only operates the heat pump, whereas the boiler is not operated unless domestic hot water is required. In this heat pump mode only, the working fluid exits the heat emitters 31 and the heat emitting section 30 via the return line 39, enters the heat pump unit 20 via the line 25 passing the first heat exchanger 22 (the bypass line 26 is closed via the valve 27) and being heated to the set flow temperature and enters the balancing vessel 37 via the line 28. In the first embodiment, the heated water exits the balancing vessel 37 via the line 29 entering into the heat emitter 31 and the heat emitting section 30 via the line 38 at the set flow temperature of for example 43 degrees Celsius as mentioned in the example above. The working fluid in this instance does not pass through the boiler unit 10. If in this instance hot water production is required, the control as well operates the burner 11 wherein working fluid is pumped by means of the pump 13 into the boiler 11 into the third heat exchanger 12 and again into the boiler, wherein heat exchange is performed with the water in the storage container 40 as described above. No working fluid may pass into the line 15 of the boiler unit 10 in this instance. In the second embodiment, the heated water flows along the bypass 56, bypassing the boiler unit 10 and enters the line 29 entering into the heat emitter 31 and the heat emitting section 30 via the line 38 at the set flow temperature of for example 43 degrees Celsius as mentioned in the example above. The working fluid in this instance does not pass through the boiler unit 10. If, in this instance, hot water production is required, the control additionally operates the burner 11 wherein water to be heated is circulated and passing the burner 11 for heat exchange.

If the heat pump in contrast is not capable of satisfying the heat load, that is, the heat pump is not capable as such to heat the working fluid to the set flow temperature the control switches to the second hybrid mode. In the second hybrid mode, the heat pump works under full load. However, the temperature of the working fluid at the temperature sensor 43 is lower than the set flow temperature. In the second hybrid mode, the working fluid in the first embodiment, therefore, leaves the balancing vessel 37 via the line 14, and in the second embodiment enters the line 14 directly, passes the second heat exchanger in the burner 11, wherein the working fluid is heated to the set flow temperature. Subsequently, the working fluid enters the balancing vessel 37 via the line 15 (first embodiment) or directly enters the line 15 (second embodiment). Afterwards the working fluid is again passed through the line 29 and 34 at the set flow-temperature to enter the heat emitting section 30 via the line 38.

In case the $COP_{Set\ Flow\ Temperature}$ is lower than the BECOP the control as shown in FIG. 3 elicits whether it is possible to preheat by means of the heat pump (step 105). In particular, it is elicited whether it is possible to set an intermediate flow-temperature at which the $COP_{Intermediate\ Flow\ Temperature}$ is higher than the BECOP calculated before. If yes, the control switches to a first hybrid mode. In a preferred embodiment the control in the first hybrid mode also lowers the return temperature as described below. If it is not possible to set an intermediate flow temperature at which the $COP_{Intermediate\ Flow\ Temperature}$ is higher than the BECOP calculated before, the control switches to a boiler only mode. In the boiler only mode, the working fluid is bypassed via the valves 27 and the line 26 by the first heat exchanger 22 entering the boiler unit 10 via the line 28, (the balancing vessel 37, only in the first embodiment) and the inlet line 14. In this instance, the working fluid is heated by the burner 11 and its second heat exchanger to the set flow temperature and subsequently enters the emitting section 30 via the line 15 (the balancing vessel 37, only in the first embodiment) and the lines 29, 34 and 38 at the set flow temperature.

In contrast, in the first hybrid mode, the control sets an intermediate set point at which the $COP_{intermediate\ set\ point}$ which is calculated as defined above is higher than the BECOP calculated previously. In this mode, the working fluid exiting the heat emitting section 30 via the line 39 enters the first heat exchanger 22 and is heated by the heat pump to the intermediate flow temperature which is measured at the temperature sensor 43. In most cases of the first hybrid mode, the heat pump will be driven under partial load, i.e. the compressor will be driven at a frequency lower than the highest frequency, but if may as well be that the heat pump will be driven under full load. In other words, both full load and partial load operation are possible in the first hybrid mode. After being heated by the heat pump (first heat exchanger), the working fluid exits the heat pump unit 20 via the line 28 and enters (via the balancing vessel 37, only in the first embodiment) into the boiler unit 10 which heats up the already heated working fluid to the set flow temperature. The working fluid is then passed via the line 56, (the balancing vessel 37, only in the first embodiment) and the lines 29, 34 and 38 into the heat emitting section 30 at the set flow temperature.

As previously indicated, the COP and the proportion of the heat pump are dependent on the return temperature of the working fluid at the temperature sensor 42. The lower the return temperature, the higher the COP of the heat pump may be (see above). Accordingly, in order to increase the proportion of the heat load provided by the heat pump in the first hybrid mode at high COP and according to a preferred embodiment of the present invention, the pump 35 is controlled so as to reduce the flow rate of the working fluid in the flow circuit in the first hybrid mode. Such a reduced flow rate lowers the return water temperature at the inlet of the first heat exchanger. Thus, lower intermediate flow temperatures are possible as the intermediate flow temperature needs to be higher than the return temperature. Then, the lower intermediate flow temperature provides for a more efficient operation because the $COP_{Intermediate\ Flow\ Temperature}$ of a lower intermediate flow temperature is higher than $COP_{Intermediate\ Flow\ Temperature}$ of a higher intermediate flow temperature because of the lower flow temperature. However, the proportion of the heat pump is lower at the lower intermediate flow temperature than at the higher intermediate flow temperature. Both the efficiency (COP) and the proportion of the heat pump influence the cost savings. The control in view of the above is configured to select the intermediate temperature so that the system works as cost effective as possible or as environmental friendly as possible.

Yet, a reduced return temperature also leads to a reduced emittance capacity of the heat emitters 31. That is, if the return temperature is decreased, the average temperature of the heat emitter 31 is reduced as well. This may lead to a decreased room temperature. In order to compensate for this loss of heat emittance capacity the control is preferably configured to increase the set flow temperature. If the flow temperature, however, is increased, the return temperature increases and the proportion of the heat pump of the heat load is lowered. In order to prevent this immediate loss of the effect described above with respect to the reduction of the return temperature, the present invention in a particular embodiment suggest to only increase the set flow temperature stepwise with a time interval inbetween each two consecutive steps. During the time between the reduction of the return temperature and the time at which the flow temperature has increased to a value leading to the required heat load of the heat emitter 31, the proportion of the heat load provided by the heat pump is higher than when the increase would happen in one step so that an improved and more environmentally friendly system is provided.

In addition, it is preferred to make the value of each step and/or the time interval in between two steps dependent on the actual room temperature measured by the sensor 33 in the space to be heated. In particular, an actual room temperature is determined based on the measurement of the temperature sensor 33 and an desired temperature is calculated based on the temperature set in the thermostat 32. Then, a temperature difference is calculated between the actual measured room temperature and the actual desired room temperature. Depending on the height of the temperature difference, the value of each step is either high or low. In particular, if there is a large difference in that the desired room temperature is much higher than the actual measured room temperature the step will be higher in order to prevent loss of comfort in the space to be heated. Alternatively or additionally, the time interval selected between two steps may be selected small so that the flow temperature is increased more rapidly. In contrast, if the difference is only very small, the value of the step may be small and/or the interval between two steps may be long because a small temperature difference will not be perceived by the user as being uncomfortable. Hence, in this instance, the proportion of the heat load by the heat pump may be higher for a longer time.

In addition, most heating systems are configured so as to heat the space to a certain value above the desired room temperature. Thus, the present invention in a particular embodiment suggests to in case the actual measured room temperature is above the desired room temperature, the flow temperature is again stepwise reduced so to again reduce the return temperature and increase the proportion of the heat load provided by the heat pump. In this instance as well, the temperature difference between the desired room temperature and the actual measured room temperature may be used to determine the value of the step and/or the time interval between two steps. In this instance, if the actual measured temperature is much higher than the desired room temperature, the value may be high, that is the flow temperature may be decreased by a large amount. In addition or alternatively, the time interval may be short. In contrast, if the difference is only small that is the actual room temperature is only slightly higher than the desired room temperature, then the value of the step may be low and/or the time interval may long so as to prevent a quick drop of the room temperature.

Moreover, when the desired room temperature remains below the measured room temperature and the set flow temperature is increased to a level at which a maximum allowable flow temperature is reached, the control may be configured to increase the flow rate, thus increasing the return temperature, but satisfying the heating demand. This is preferably done in steps as well. Fixed steps (values) are preferred in this regard, but a variable adaption as explained with respect to the flow temperature and the time interval is conceivable as well. If the desired room temperature is reached, the flow rate is again reduced, however, preferably not stepwise, but in one step so as to immediately increase the proportion of the heat provided by the heat pump. Subsequently, the flow temperature may be reduced stepwise as described above.

Beside the above modes, it is as well conceivable that the heating system is used for cooling the space as well. In this cooling mode, the heat pump is operated only but in a reverse cycle in the circuit 21, that is the flow direction indicated in FIG. 1 in the flow circuit 21 is reversed. In this instance, the first heat exchanger 22 serves as the evaporator of the heat pump extracting heat from the working fluid. Thus, the working fluid is cooled before entering the heat emitters 31 and, therefore, may be used for cooling as well.

INDUSTRIAL APPLICABILITY

It is clear that the present invention has been described based on particular and preferred embodiments of the present invention. However, the present invention may as well be practiced differently. For example, other fuels than gas may be used for the boilers. In addition, a conventional gas boiler instead of the condensed gas boiler may be used as well. In addition and although an air heat pump is preferred, other types of heat pumps may be used as well such as geothermic heat pumps, etc. In addition and as previously mentioned, instead of inputting the corresponding fuel and electricity price, an online connection may be provided in order to retrieve prices online for example via the internet from the providers.

The invention claimed is:

1. A heating system comprising:
a flow circuit arranged and configured to carry a flow of a working fluid at a set flow temperature to a heat emitting section in order to perform heating of a space;
an electricity driven heat pump having a first heat exchanger connected to the flow circuit to transfer heat to the working fluid;
a fuel fired boiler having a second heat exchanger connected to the flow circuit to transfer heat to the working fluid downstream of the first heat exchanger; and
a control configured
   to determine a coefficient of performance ($COP_{Set\ Flow\ Temperature}$) of the heat pump for the set flow temperature,
   to determine a break even coefficient of performance (BECOP), the BECOP being an electricity price divided by a fuel price multiplied by a thermal efficiency of the boiler,
   to compare the $COP_{Set\ Flow\ Temperature}$ with the BECOP, and
   if the $COP_{Set\ Flow\ Temperature}$ is smaller than the BECOP in a first hybrid mode,
      to determine an intermediate flow temperature at which the $COP_{Intermediate\ Flow\ Temperature}$ is higher than the BECOP,
      to operate the heat pump so that the working fluid is heated to the intermediate flow temperature by the first heat exchanger and
      to operate the boiler so that the working fluid is heated from the intermediate flow temperature to the set flow temperature by the second heat exchanger.

2. The heating system according to claim 1, further comprising
a pump, the control being further configured to control the pump so as to reduce a flow rate of the working fluid so that a return temperature of the working fluid returned to the first heat exchanger is lowered in the first hybrid mode.

3. The heating system according to claim 2, wherein
the control is further configured to increase or decrease the set flow temperature stepwise with a time interval in between two consecutive steps, after the flow rate of the working fluid has been reduced, in the first hybrid mode.

4. The heating system according to claim 3, further comprising
a room sensor arranged and configured to measure a room temperature in the space to be heated, and
at least one of a value of each step and a length of each time interval is dependent on the difference between the desired room temperature in the space to be heated and the measured room temperature.

5. The heating system according to claim 4, wherein
the control is further configured to control the pump so as to increase the flow rate of the working fluid stepwise, when a maximum allowable flow temperature has been reached and the measured room temperature in the space to be heated is lower than the desired room temperature.

6. The heating system according to, claim 1, wherein
the control is further configured to determine whether the heat pump is capable of satisfying a required heating demand to heat the working fluid to the set flow temperature or the intermediate flow temperature and to determine an operation mode based on the determination.

7. The heating system according to claim 6, wherein
the control is further configured to operate the heat pump and the boiler in the first hybrid mode if the heat pump is capable of satisfying the required heating demand to heat the working fluid to the intermediate flow temperature.

8. The heating system according to claim 6, wherein
the control is further configured to operate the heat pump only in a heat pump mode if the $COP_{Set\ Flow\ Temperature}$ is higher than the BECOP and the heat pump is capable of satisfying the required heating demand to heat the working fluid to the set flow temperature.

9. The heating system according to claim 6, wherein
the control is further configured to operate the boiler and the heat pump in a second hybrid mode if the $COP_{Set\ Flow\ Temperature}$ is higher than the BECOP and the heat pump is not capable of satisfying the required heating demand to heat the working fluid to the set flow temperature.

10. The heating system according to claim 6, wherein
the control is further configured to operate the boiler only in a boiler only mode if the $COP_{Set\ Flow\ Temperature}$ is smaller than the BECOP and the heat pump is not capable of satisfying the required heating demand to heat the working fluid to the intermediate flow temperature.

11. The heating system according to claim 1, wherein
the flow circuit is hydraulically separated between the heat pump and the boiler.

12. A method for controlling a heating system including
a flow circuit arranged and configured to carry a flow of a working fluid at a set flow temperature to a heat emitting section in order to perform heating of a space;
an electricity driven heat pump having a first heat exchanger connected to the flow circuit to transfer heat to the working fluid;
a fuel fired boiler having a second heat exchanger connected to the flow circuit to transfer heat to the working fluid downstream of the first heat exchanger;
the method comprising:
determining a coefficient of performance ($COP_{Set\ Flow\ Temperature}$) of the heat pump for the set flow temperature;
determining a break even coefficient of performance (BECOP), the BECOP being an electricity price divided by a fuel price multiplied by a thermal efficiency of the boiler
comparing the $COP_{Set\ Flow\ Temperature}$ with the BECOP; and
if the $COP_{Set\ Flow\ Temperature}$ is smaller than the BECOP in a first hybrid mode
determining an intermediate flow temperature at which the $COP_{Intermediate\ Flow\ Temperature}$ is higher than the BECOP,
operating the heat pump so that the working fluid is heated to the intermediate flow temperature by the first heat exchange, and
operating the boiler so that the working fluid is heated from the intermediate flow temperature to the set flow temperature by the second heat exchanger.

13. The method according to claim 12, further comprising
in the first hybrid mode, reducing the flow rate of the working fluid so that a return temperature of the working fluid returned to the first heat exchanger is lowered.

14. The method according to claim 13, further comprising
in the first hybrid mode, increasing or decreasing the set flow temperature stepwise with a time interval in between two consecutive steps, after the flow rate of the working fluid has been reduced.

15. The method according to claim 14, further comprising
measuring a room temperature in the space to be heated, and
at least one of a value of each step and a length of each time interval is determined dependent on the difference between the desired room temperature in the space to be heated and the measured room temperature.

16. The method according to claim 15, further comprising
in the first hybrid mode, increasing the flow rate of the working fluid stepwise, when a maximum allowable flow temperature has been reached and the measured room temperature in the space to be heated is lower than the desired room temperature.

17. The method according to claim 12, further comprising
determining whether the heat pump is capable of satisfying a required heating demand to heat the working fluid to the set flow temperature or the intermediate flow temperature and
at least one of
operating the heat pump and the boiler in the first hybrid mode if the heat pump is capable of satisfying the required heating demand to heat the working fluid to the intermediate flow temperature,
operating the heat pump only in a heat pump mode if the $COP_{Set\ Flow\ Temperature}$ is higher than the BECOP and the heat pump is capable of satisfying the required heating demand to heat the working fluid to the set flow temperature,
operating the boiler and the heat pump in a second hybrid mode if the $COP_{set\ Flow\ Temperature}$ is higher than the BECOP and the heat pump is not capable of satisfying the required heating demand to heat the working fluid to the set flow temperature
operating the boiler only in a boiler only mode if the $COP_{Set\ Flow\ Temperature}$ is smaller than the BECOP and the heat pump is not capable of satisfying the required heating demand to heat the working fluid to an intermediate flow temperature.

* * * * *